Dec. 13, 1966    A. HALPERT    3,291,098
CONVERTIBLE FISH DISPLAYER AND BREEDER FOR AQUARIUMS
Filed Feb. 25, 1965    2 Sheets-Sheet 1
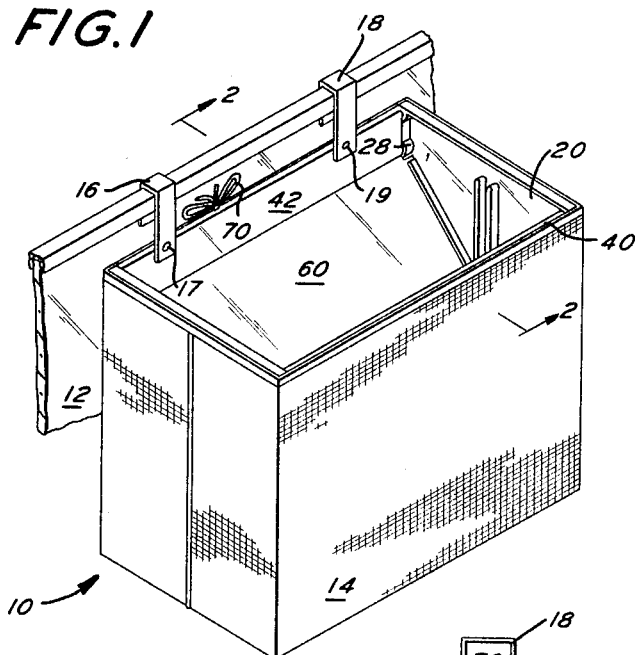
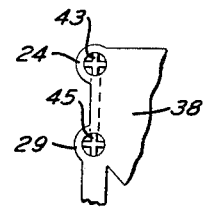
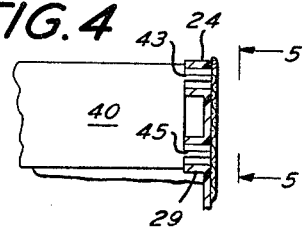
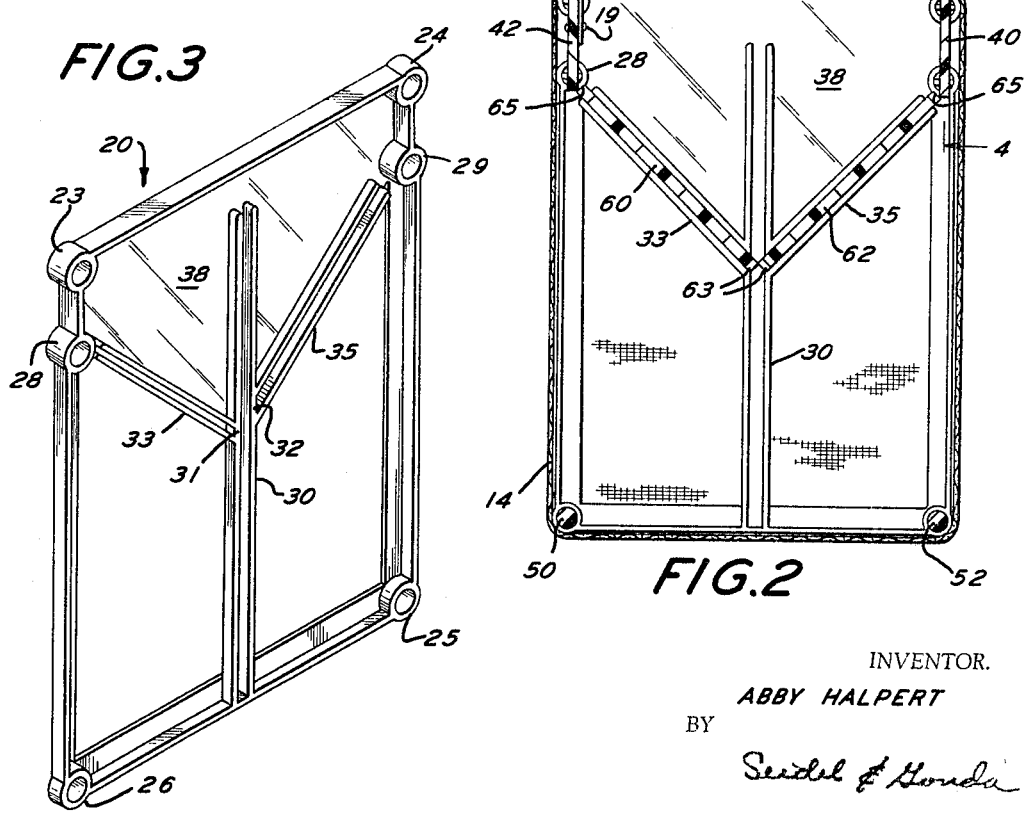
INVENTOR.
ABBY HALPERT
BY
Seidel & Gonda
ATTORNEYS.

Dec. 13, 1966 A. HALPERT 3,291,098
CONVERTIBLE FISH DISPLAYER AND BREEDER FOR AQUARIUMS
Filed Feb. 25, 1965 2 Sheets-Sheet 2
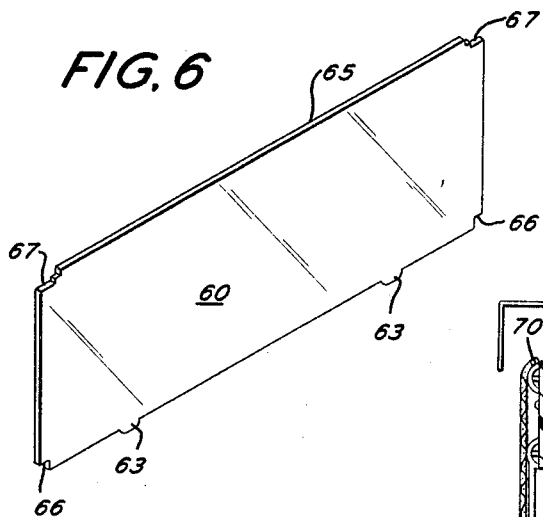
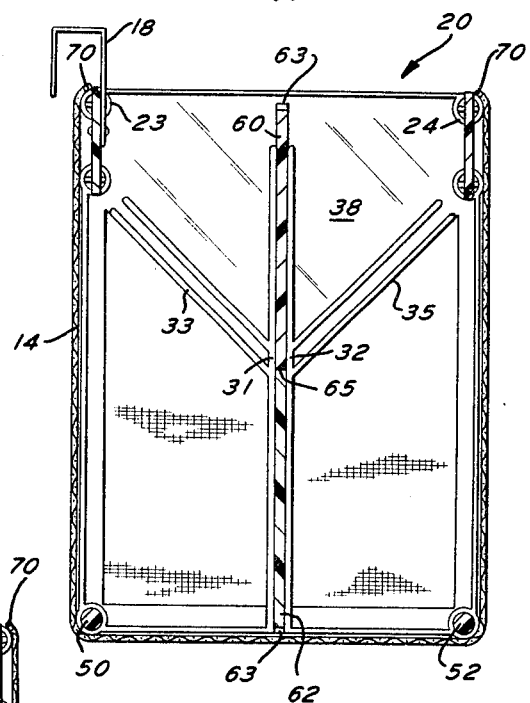
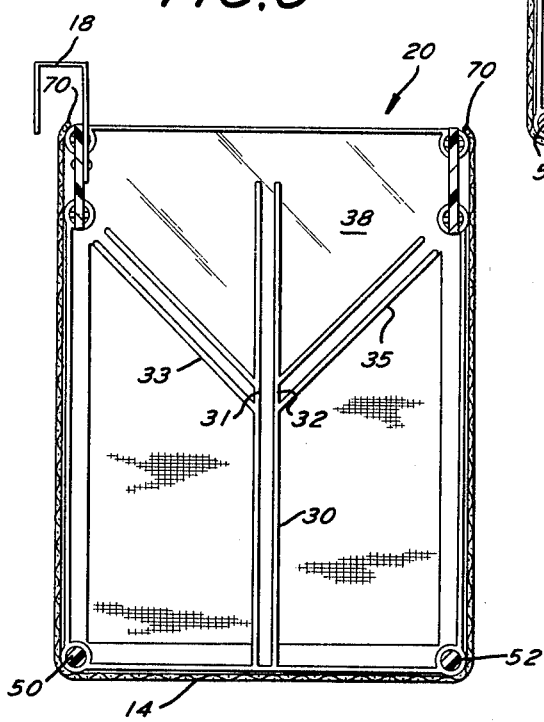
INVENTOR.
ABBY HALPERT
BY
ATTORNEYS.

United States Patent Office 3,291,098
Patented Dec. 13, 1966

3,291,098
CONVERTIBLE FISH DISPLAYER AND
BREEDER FOR AQUARIUMS
Abby Halpert, Brooklyn, N.Y., assignor to Halvin Products Co., Inc., Brooklyn, N.Y., a corporation of New York
Filed Feb. 25, 1965, Ser. No. 435,238
10 Claims. (Cl. 119—5)

This invention relates generally to fish aquariums and in particular to the display and breeding of fish therein.

Certain species of tropical fish are extremely combative and others display a marked cannabilistic tendency toward their own progeny. Naturally, it is desirable to keep certain fighting fish apart, such as the Betta, as well as certain species of parent fish separate from their own eggs or offspring. Yet it is often desirable to display all these fish and their progency together in the same aquarium tank.

In the past, a transparent container having numerous small openings in its bottom was placed in the tank and formed a partition where certain fish could be kept separate. Since tropical fish are extremely sensitive to temperature and air content of the ambient water, temperature and aeration means are normally provided in an aquarium tank. The enclosed nature of the prior art prevented a free circulation between it and the aquarium tank, and thus it was not always possible to maintain the proper levels of aeration and temperature within the partition area.

Therefore, to overcome the foregoing and other difficulties of the prior art, it is the general object of this invention to provide a new and better fish displayer and breeder-trap for use within an aquarium tank.

It is the object of this invention to provide a fish displayer and breeder-trap in an aquarium tank through which ambient water can freely circulate.

Another object is to provide a fish displayer and breeder-trap that is substantially open to an aquarium tank for a free water circulation therebetween.

A further object is to provide a fish displayer and breeder-trap which is readily convertible for differing display and breeding purposes.

Another object is to provide a fish display and breeder-trap which is economical to produce and which utilizes conventional currently available materials that lend themselves to standard mass production manufacturing techniques.

Other objects will appear hereinafter.

For the purpose of illustrating the invention, there are shown in the drawings forms which are presently preferred; it being understood, however, that this invention is not limited to the precise arrangements and instrumentalities shown.

Further and other objects and a fuller understanding of the invention may be had by referring to the following description and claims, taken in conjunction with the accompanying drawings, in which:

FIGURE 1 is a perspective view of the fish displayer and breeder-trap hanging on a portion of an aquarium wall.

FIGURE 2 is a sectional view of the fish displayer and breeder-trap taken along line 2—2.

FIGURE 3 is a perspective view of an end frame.

FIGURE 4 is a sectional view taken in the direction of line 4—4 of FIGURE 2.

FIGURE 5 is an end view of FIGURE 4 taken on line 5—5.

FIGURE 6 is a perspective view of a divider plate.

FIGURE 7 is a sectional view similar to FIGURE 2, but displaying an alternate disposition of the divider plates therein.

FIGURE 8 is a sectional view similar to FIGURE 2, but showing an alternate arrangement for use as a hospital tank.

Referring to the drawings in detail, wherein like numerals indicate like elements, there is shown in FIGURE 1 is a fish displayer and breeder-trap of the present invention designated generally as 10. The fish displayer and breeder-trap 10 is a generally open rectangular framework covered by a net 14 and suspended at a desired depth within the aquarium tank 12 by means of hanger straps 16 and 18.

One of the two identical end frames 20, used in forming the rectangular framework, is shown in detail at FIGURE 3. The end frames 20 have an open rectangular configuration formed by members of a right angular cross-section for rigidity. A juncture boss 23, 24, 25, 26 is formed at each corner of the rectangular end frame 20, as shown. Additional juncture bosses 28, 29 are provided at each side of frame 20 near the upper juncture bosses 23, 24. Each of the juncture bosses is bored therethrough, as shown, to provide a juncture hole thereat. A central channel member 30 is integrally formed in the end frame 20 to provide a divider slot vertically disposed along the center line of the frame 20. Oblique channel members 33 and 35 provide divider slots which are downwardly inclined from the juncture bosses 28 and 29, respectively, to a point at vertical channel member 30. The oblique channel members 33, 35 join the vertical channel member 30 to form the Y-like configuration illustrated. Notice that the divider slots of the various channel members 30, 33, 35 do not communicate because of side portions 31, 32 of channel member 30. The end frame 20 is an open framework beneath the oplique channels 33 and 35. However, the upper portion of frame 20, above the oblique channels 33, 35 is enclosed by an integral impervious sidewall 38. The end frame 20 is preferably fabricated out of a transparent plastic material.

The side members 40, 42 provide elongated solid side walls having a height corresponding to the distance between the juncture boss 28, 23 and 29, 24, respectively. Side wall members 40, 42 are preferably of a solid transparent plastic material and have fluted studs 43, 45 for juncture within respective junction bosses, as shown in detail in FIGURES 4 and 5. Fluted rods 50, 52 (shown only in cross-section) are provided for insertion between the bottom juncture bosses 26, 25 of two opposed end frames 20. The flutted rods 52, 50 and the flutted studs 43, 45 are of a size conforming to the juncture holes in the juncture bosses 23, 24, 25, 26, 28 and 29 and may be inserted forcibly therein to form a rectangular open framework between the two opposed end frames 20. The side wall member 42 is secured to the hanger straps 16, 18 by means of rivets 17, 19.

Partition plates 60, 62 are provided of a flat transparent material in the configuration illustrated at FIGURE 6. Each partition plate has a flat longitudinal edge 65 and spacing tabs 63. The partition plates 60, 62 have a transverse width complementary to the length of oblique channels 33, 35 as shown in FIGURE 2, and are easily accommodated between the opposed end frames 20, within the slots of the channels 30, 33 and 35, as will be hereinafter described. The net 14 is a mesh which will contain the smallest of fish therein and yet allow a free passage of water therethrough. It is preferably fabricated of a water resistant synthetic fiber in a bag-like shape closely conforming to the aforementioned open framework. A drawstring 70 is provided to tighten the net 14 upon the framework.

It is understood, of course, that the open framework is easily assembled and disassembled for the purpose of changing the partitions to convertible positions within the slots of channels 30, 33 and 35.

The assembly shown in cross-section at FIGURE 2 is a breeder-trap. In this instance, the framework is assembled with a partition plate 60, 62 in the respective slots of oblique channels 33, 35. Notches 66, 67 at each corner of partition plates 60, 62, enable a close fitting of the juncture bosses 28, 29 and at side portions 31, 32 of channel member 30. The opposed tabs 63 separate the partition plates to form a long narrow slot along their lowermost edges. Notice that partition plates 60, 62 end walls 38, and side walls 40, 42 form an enclosed V trap, opening downward at an apex slot. The open framework below the V trap is enclosed by net 14. A pregnant female fish is placed within the enclosed V trap and may be observed through the transparent walls thereof. As baby fish are born, they fall through the narrow slot between the partition plates 60, 62 and into the netted area below, where they are safe.

The partition plates 60, 62 may be assembled as shown by the cross-section of FIGURE 7 to form a Betta display tank. There the partition plates 60, 62 are placed between the opposed end frames 20 in the slots provided by vertical channels 30. The partition plates abut at the flat edges 65 to form a solid and transparent partition wall dividing the framework into two chambers. Two Bettas may be displayed by placing one on either side of the partition plates 60, 62. In this manner, the fighting fish may be displayed apart from each other and from other fish in the aquarium.

The partition plates 60, 62 may be entirely removed from the framework to provide a single Betta display tank or hosptial tank, as shown in FIGURE 8.

The present invention may be embodied in other specific forms without departing from the spirit of essential attributes thereof and, accordingly, reference should be made to the appended claims, rather than to the foregoing specifications as indicating the scope of the invention.

I claim:

1. A convertible fish displayer and breeder-trap for use in an aquarium tank, comprising a framework including ends defining a space, a net attached to said framework enclosing said space, said net permitting the free flow of water into and out of said space, and means on said ends to convertibly partition said space into separate compartments, said partition means including individual partition members supported by said end means, and said compartments having a substantial portion thereof defined by said net and said individual partition members.

2. A fish displayer and breeder-trap in accordance with claim 1 wherein said framework is an open (three-dimensional) rectangular configuration having means thereon to suspend said framework at a desired depth in said aquarium tank.

3. A fish displayer and breeder-trap in accordance with claim 2 wherein said partition means includes a V trap having a slot at the apex thereof.

4. A convertible fish displayer and breeder-trap for use in an aquarium tank comprising a pair of opposed open rectangular end frames, each frame having a vertically disposed central channel member, and oblique channel members extending outward from opposite sides of said central channel member, a longitudinal member disposed between and coupled to said frames to maintain a desired space and form an open framework therebetween, means to suspend said framework at a desired depth in an aquarium tank, a net enclosing said framework, and partition plates received within some of said channel members to partition space wtihin said framework into separate compartments.

5. A fish displayer and breeder-trap in accordance with claim 4, wherein said partition plates are contained within said oblique channel members to form a V trap within said framework with a slot at its apex.

6. A convertible fish displayer and breeder-trap for use in an aquarium tank comprising, a pair of opposed rectangular end frames having juncture bosses at each corner thereof, each frame including a vertically disposed central channel member and downwardly inclined oblique channel members intersecting said channel member, each end frame including an integral closure wall above said oblique channel members and being open therebelow, four longitudinal members extending between and coupled to end frames at said juncture bosses to form a rectangular framework, means to suspend said framework at a desired depth within an aquarium tank, a net enclosing said framework, and a pair of partition plates received within some of said channel members to partition space within said framework into two separate compartments.

7. The fish displayer and breeder-trap of claim 6 wherein said framework and said partition plates are of a transparent material.

8. A fish displayer and breeder-trap in accordance with claim 7 wherein said oblique and central channel members have central axes intersecting at a common point on each frame, and said partition plates being slidably received within said oblique channel members to form a V trap having a narrow slot between said plates at said point.

9. A fish displayer and breeder-trap in accordance with claim 8 wherein said partition plates are removable so that they may be readily disassembled and assembled with respect to the framework for conversion into different compartments.

10. Apparatus for use in an aquarium tank comprising a rectangular frame having side walls of net material with a sufficient number of openings to permit free flow of water from and into said frame, said frame having a bottom wall of net material, partitions extending between and supported by opposite end walls of said frame, said partitions converging downwardly toward the bottom wall with a slot between adjacent edges of said partitions, said slot providing communication between the space above said partitions and the space below said partitions, and means for supporting said frame in an aquarium tank.

References Cited by the Examiner
UNITED STATES PATENTS 3,140,691 7/1964 Stark _____ 119—5
3,216,395 11/1965 Girard _____ 119—5

SAMUEL KOREN, *Primary Examiner.*

ALDRICH F. MEDBERY, *Examiner.*